(12) United States Patent
Kaiser et al.

(10) Patent No.: US 7,169,478 B2
(45) Date of Patent: Jan. 30, 2007

(54) ALUMINUM-BASED MULTINARY ALLOYS AND THEIR USE AS HEAT- AND CORROSION-RESISTANT COATINGS

(75) Inventors: Anton Kaiser, Buelach (CH); Valery Shklover, Zurich (CH); Walter Steurer, Zurich (CH); Ivan Victor Vjunitsky, Moscow (RU)

(73) Assignee: Alstom Technology Ltd., Baden (CH)

( * ) Notice: Subject to any disclaimer, the term of this patent is extended or adjusted under 35 U.S.C. 154(b) by 61 days.

(21) Appl. No.: 10/892,141

(22) Filed: Jul. 16, 2004

(65) Prior Publication Data

US 2005/0031891 A1    Feb. 10, 2005

(30) Foreign Application Priority Data

Jul. 16, 2003   (DE)   ................. 103 32 420

(51) Int. Cl.
    B32B 15/04    (2006.01)
    C22C 21/00    (2006.01)
    C22C 19/03    (2006.01)
    C22C 30/00    (2006.01)

(52) U.S. Cl. ................. 428/633; 428/652; 428/678; 428/680; 420/550; 420/551; 420/460; 420/580; 416/241 R (58) Field of Classification Search ................. 428/650, 428/655; 420/551
    See application file for complete search history.

(56) References Cited

U.S. PATENT DOCUMENTS

| | | | |
|---|---|---|---|
| 4,447,538 A | 5/1984 | Goodman et al. |
| 4,759,380 A | 7/1988 | Norman et al. |
| 4,980,244 A | 12/1990 | Jackson |
| 5,011,554 A | 4/1991 | Fleischer |
| 5,152,853 A | 10/1992 | Fleischer |
| 5,645,893 A | 7/1997 | Rickerby et al. |
| 5,667,663 A | 9/1997 | Rickerby et al. |
| 5,763,107 A | 6/1998 | Rickerby et al. |

(Continued)

FOREIGN PATENT DOCUMENTS

DE    40 01 484 A1    8/1991

(Continued)

OTHER PUBLICATIONS

Search Report from DE 103 32 420.8 (Jan. 23, 2004).

(Continued)

*Primary Examiner*—John J. Zimmerman
(74) *Attorney, Agent, or Firm*—Cermak & Kenealy, LLP; Adam J. Cermak

(57) ABSTRACT

Multinary alloys, in particular for use as coatings, if appropriate in combination with other types of layers, for components which are exposed to high temperatures and corrosive gases. The alloys are of the general form: Al—Ni—Ru-M, where at least one B2 phase is present, the aluminum content being in the range from 26–60 atomic percent and where M may be one or more metals and/or semimetals selected from the group consisting of: precious metal, transition metal, rare earths, semimetal. Multinary alloys of this type are very stable with respect to oxidation, have a low thermal conductivity and in particular have similar coefficients of thermal expansion to superalloys, which are usually used as substrates for protective coatings of this type in gas turbine components.

46 Claims, 9 Drawing Sheets a)

b)

c)

d)

U.S. PATENT DOCUMENTS

| | | | |
|---|---|---|---|
| 5,888,661 A | 3/1999 | Dubois et al. | |
| 5,942,337 A | 8/1999 | Rickerby et al. | |
| 5,981,091 A | 11/1999 | Rickerby et al. | |
| 6,306,524 B1 | 10/2001 | Spitsberg et al. | |
| 6,554,920 B1 | 4/2003 | Jackson et al. | |
| 6,582,534 B2* | 6/2003 | Jackson et al. | 148/430 |
| 6,921,586 B2* | 7/2005 | Zhao et al. | 428/652 |
| 2002/0197502 A1* | 12/2002 | Zhao et al. | 428/632 |

FOREIGN PATENT DOCUMENTS

| | | |
|---|---|---|
| DE | 694 01 260 T2 | 4/1997 |
| EP | 0 521 138 B1 | 11/1997 |

OTHER PUBLICATIONS

Search Report from EP 04 10 3291 (Sep. 21, 2004).

Massalski, T.B. "Al-Ru (Aluminum-Ruthenium)." Binary alloy phase diagrams 1990:203, (no month given).

Fleischer, R.L., Field, R.D., and Briant, C.L., "Mechanical Properties of High-Temperature Alloys of AlRu." Metallurgical Transactions A: 22A (Feb. 1991, TMS & ASM Int'l): 403-414.

Wolff, G. Sauthoff. "High-Temperature Behavior of Precious Metal Base Compositions." Metallurgical and Materials Transactions A; 27A (Sep. 1996, TMS & ASM Intl'l): 2642-2652.

McKee, Douglas, Robert Fleischer. "Oxidation Behavior of advanced Intermetallic Compounds." Materials Research Society 213 (1991: Materials Research Society) 969-974, (no month given).

Wolff, G. Sauthoff, L.A Cornish. H.DeV. Steyn, and R. Coetzee. "Structure-Property-Application Relationships in Ruthenium Aluminide RuAl." Structural Intermetallics (1997: The Minerals, Metals & Materials Society) 815-823, (no month given).

Terada, Yoshihiro et al. "Thermal conductivity of B2-type aluminides and titanides." Intermetallics 3: 347-355 (1995, , Elsevier Science Ltd), (no month given).

Datta, P.K., J.S Burnell-Gray, K. Natesan. "Coating Technology." Ed. J.H Westbrook, R.L Fleischer. Intermetallic Compounds- Principles and Practice 3 (2002, John Wiley & Sons): 562-588, (no month given).

Jehn, Hermann. "High Temperature Behavior of Platinum Group Metals in oxidizing Atmospheres." Journal of the Less-Common Metals 100: 321-339 (Elsevier Sequoia, Netherlands 1984), (no month given).

Kofstad, Per. "High Temperature Corrosion." (New York: Elsevier Applied Science, 1988), 268-272, (no month given).

Parker, W.J. et al. "Flash Method of Determining Thermal Diffusivity, Heat Capacity, and Thermal Conductivity." Journal of Applied Physics 32 No. 9 (1961, publisher unknown): 1679-1684, (no month given).

Lamesle, P., P. Seinmetz, J. Steinmetz. "Palladium-Modified Aluminide Coatings: Mechanisms of Formation." J.Electrochem. Soc. 142 No. 2 (1995, The Electrochemical Society, Inc.): 497-505, (no month given).

Hohls, J. et al. "Solidification phases and liquids surface of the Al-Ni-Ru system above 50 at. % aluminium." Journal of Alloys and Compounds 308 (2000, Elsevier Science S.A.): 205-215, (no month given).

Horner, I.J. et al. "An investigation of the B2 phase between AlRu and AlNi in the Al-Ni-Ru ternary system." Journal of Alloys and Compounds 264 (1998, Elsevier Science S.A.): 173-179, (no month given).

Horner, I.J. et al. "Constitution of the Al-Ni Ru ternary system above 50 at. & aluminium." Journal of Alloys and Compounds 256 (1997, Elsevier Science S.A.): 221-227, (no month given).

Chakravorty, S., D.R.F. West. "The constitution of the Ni-Al-Ru system." Journal of Materials Science 21 (1986, Chapman and Hall Ltd.): 2721-2730, (no month given).

Chakravorty, S., D.R.F West. "Phase equilibria between NiAl and RuAl in the Ni-Al-Ru system." Scritpa Metallurgica 19 (1985, Pergamon Press Ltd): 1355-1360, (no month given).

Reddy, B.V., S.C Deevi. "Thermophsyical properties of FeAl (Fe-40 at. % Al)." Intermetallics 8 (2000, Elsevier Science Ltd): 1369-1376, (no month given).

Wollf, Ira M. "Precious Metal Compounds." Intermetallic Compounds- Principles and Practice 3 (2002, John Wiley & Sons): 53-84, (no month given).

Massalski, T.B. (ed.). Al-Ru (Aluminum-Ruthenium), "Binary Alloy Phase Diagrams" 2ed. OH, p. 203 (1990, ASM Int'l), (no month given).

Petrovoj, Diagrammy Sostoyaniya Matallicheskikh System, ed. N.V. Ageeva, VINITI Moskau, 30, 323 (1985), (no month given).

Namba, S. et al. "Measurement of thermal diffusivity by laser pulse." J. Appl. Phys. 6 (1967): 1019, (no month given).

\* cited by examiner

ALUMINUM-BASED MULTINARY ALLOYS AND THEIR USE AS HEAT- AND CORROSION-RESISTANT COATINGS

This application claims priority under 35 U.S.C. § 119 to German application number 103 32 420.8, filed 16 Jul. 2003, the entirety of which is incorporated by reference herein.

BACKGROUND OF THE INVENTION

1. Field of the Invention

The present invention relates to alloys, in particular for use as heat- and corrosion-resistant coatings, if appropriate in combination with other types of layers, for components which are exposed to high temperatures and corrosive gases. The present invention also relates to processes for producing coatings from alloys of this type in particular on substrates formed from superalloys, and to the use of coatings of this type in particular for coating components of gas turbines or jet engines.

2. Brief Description of the Related Art

Numerous works have dealt with analysis of the thermodynamic stability, mechanical properties and corrosion resistance of the Al—Ru and Al—Ni—Ru B2 alloys. The B2 phase is an ordered cubic phase AB in which the A atoms are arranged at the corners of the unit cell and the B atoms are arranged in the center of the unit cell (cP2- CsCl structure type). B2 Al—Ru is a thermodynamically stable phase which melts congruently at the very high temperature of 2050° C. (cf. in this respect Massalski T. B. (Editor), Binary alloy phase diagrams, 2nd edition OH: ASM International, (1990), 1, 203) and contains a significant amount of aluminum, which is required in order to form the layer of aluminum deposits which provides protection against oxidation. Surprisingly good mechanical properties, including satisfactory mechanical formability at room temperature, are other attractive properties of the Al—Ru B2 phases (cf. in this respect U.S. Pat. No. 5,152,853; Fleischer R. L., (1991), Metall. Trans. A, 22A, 403; U.S. Pat. No. 5,011,554; Wolff I. M., Sauthoff G., (1996), Metall. And Mater. Trans. A, 27A, 2642). Moreover, it has been reported that the oxidation resistance of B2 ruthenium aluminide can be significantly improved by an alloy with a small proportion of yttrium (up to 1 atomic %) and chromium (up to 5 atomic %) (cf. in this respect McKee D. W., Fleischer R. L., (1991), Mat. Res. Soc. Symp. Proc., 213, 969; and Wolff I. M., Sauthoff G., Cornish L. A., Steyn H. DeV., Coetzee R., (1997), Structural Intermetallics, ed. Nathal D. B. et al, 815).

Currently the only intermetallic B2 compounds whose thermal conductivity has been investigated are the following: AlNi, AlFe and AlCo (cf. in this respect Terada Y., Ohkubo K., Nakagawa K., Mohri T., Suzuki T., (1995), Intermetallics, 3, 347; and Reddy B. V., Deevi S. C., (2000), Intermetallics, 8, 1369).

The Al—Ni—Ru phase diagram has been investigated at different temperatures (cf. in this respect Tsurikov V. F., Sokolovskaya E. M., Kazakova E. F., (1980), Vestnik Moskovskogo Univ. Khim., 35(5), 113; Petrovoj L. A., (1985), Diagrammy Sostoyaniya Metallicheskikh System, ed. N. V. Ageeva, VINITI, Moskau, 30, 323; Chartavorty S., West D. R. F., (1985), Scripta Metall., 19, 1355; Chartavorty S., West D. R. F., (1986), J. Mater. Sci., 21, 2721; Homer I. J., Hall N., Cornish L. A., Witcomb M. J., Cortie M. B., Boniface T. D., (1998), J. Alloys and Compds, 264, 173; Homer I. J., Cornish L. A., Witcomb M. J., (1997), J. Alloys and Compds, 256, 221; Hahls J., Cornish L. A., Ellis P., Witcomb M. J., (2000), J. Alloys and Compds, 308, 205). The information available in connection with these studies varies noticeably. Tsurikov et al. report two B2 phases, which are based on AlNi and AlRu, in a ternary system at 550° C. (cf. in this respect Tsurikov V. F., Sokolovskaya E. M., Kazakova E. F., (1980), Vestnik Moskovskogo Univ. Khim., 35(5), 113), asserting that AlRu (β1) is able to dissolve up to 8 atomic % of nickel, and AlNi (β2) is supposed to be able to dissolve up to 5 atomic % of ruthenium. By contrast, Petrovoj found an unlimited solubility between the two B2 phases at 800° C. within the ternary system (cf. in this respect Petrovoj L. A., (1985), Diagrammy Sostoyaniya Metallicheskikh System, ed. N. V. Ageeva, VINITI, Moskau, 30, 323). Chakrovorty et al. have indicated a miscibility gap between AlRu and AlNi up to high temperatures and have recorded the existence of a ternary equilibrium state β1–β2-γ' (cf. in this respect Chartavorty S., West D. R. F., (1985), Scripta Metall., 19, 1355; Chartavorty S., West D. R. F., (1986), J. Mater. Sci., 21, 2721).

More recent works have described a continuous solid solution between AlRu and AlNi phases, although all specimens produced (using the casting process) had two phases, and annealing was in each case carried out for only a short time (less than 48 hours) (cf. in this respect Homer I. J., Hall N., Cornish L. A., Witcomb M. J., Cortie M. B., Boniface T. D., (1998), J. Alloys and Compds, 264, 173; Homer I. J., Cornish L. A., Witcomb M. J., (1997), J. Alloys and Compds, 256, 221; Hahls J., Cornish L. A., Ellis P., Witcomb M. J., (2000), J. Alloys and Compds, 308, 205). The authors have explained the two phases in the specimen on the basis of a so-called "coring effect", which is supposed to occur on account of the different crystallization initiation for phases with very divergent solidus temperatures. This effect is supposed to be revealed by unclear boundaries between the grains and by the variation in the grain compositions.

Oxidation-resistant coatings based on nickel aluminides (nickel-aluminum alloys) which have been modified by precious metals, preferably by platinum, are already known (cf. in this respect Wolff I. M., (2002) in Intermetallic Compounds, ed. Westbrook J. H. and Fleischer R. L., 3, 53; Datta P. K., (2002) in Intermetallic Compounds, ed. Westbrook J. H. and Fleischer R. L., 3, 651; U.S. Pat. No. 4,447,538; U.S. Pat. No. 5,763,107; U.S. Pat. No. 5,645,893; U.S. Pat. No. 5,667,663; U.S. Pat. No. 5,981,091; U.S. Pat. No. 5,942,337; Lamesle P., Steinmetz P., Steinmetz J., Alperine S., (1995), J. Electrochem. Soc., 142(2), 497). The main advantage of coatings of this type compared to MCrAlY bond coatings (BC) is the improved bonding of the outer layer of a thermally insulating oxide (normally yttrium-stabilized zirconium, YSZ) to the metallic substrate. This bonding is effected by the formation of a pure, slow-growing α-Al$_2$O$_3$ layer at the interface between YSZ/BC during operation. Unfortunately, the platinum group metals which can be used as materials for thermal barrier coatings (TBC) have some drawbacks. These include, for example, the very high price of the metals, the depletion of aluminum in those interlayers which are enriched with precious metal, the high vapor pressure of the metals and volatility of the oxides which primarily occur (platinum dioxide, rhodium dioxide, etc.). This leads to a significant loss of the valuable metals during exposure to the aggressive, oxidizing environment at high temperatures (cf. in this respect Datta P. K., (2002) in Intermetallic Compounds, ed. Westbrook J. H. and Fleischer R. L., 3, 651; Kofstad P., (1988), High temperature corrosion, Elsevier applied science publishers LTD; Jehn H., (1984), J. Less-Common Met., 100,321).

Oxidation-resistant alloys which contain ruthenium have also already been investigated, and corresponding coating methods have already been developed (cf. in this respect U.S. Pat. No. 4,980,244; U.S. Pat. No. 4,759,380). The alloys studied probably consisted of a mixture of B2-CrRuAl and CrRuFeAl phases and an Ru- or Cr-based solid solution. A separate α-Cr phase was assumed in some compositions. The authors investigated CrRuAl alloys within the composition range from 0 to 60 atomic % in chromium, where the Ru:Al ratio was kept at approximately 50:50 in CrRuFeAl alloys. The best oxidation properties were discovered for alloys with a chromium content of between 30 and 60 atomic %. The CrRuFeAl and CrRuAl alloys have already been proposed as high-temperature protective coatings for different materials: superalloys, refractory metals or alloys with a refractory metal base, titanium or niobium aluminides, etc. Another possible application for Ru-containing phases is as a diffusion barrier for TBCs in order to prevent interdiffusion between the substrate and the bond coat (BC) (cf. in this respect U.S. Pat. No. 6,306,524). CrRuFeAlY alloys containing structural high-temperature materials have likewise already been investigated (cf. in this respect U.S. Pat. No. 6,306,524).

SUMMARY OF THE INVENTION

Accordingly, the invention is based on the object of proposing a novel material from which coatings for surfaces exposed to high temperatures and a corrosive environment can particularly preferably be produced.

The solution to this object is achieved by the proposal of a multinary alloy, i.e. an alloy which contains more than three different components, of the general form $Al_x$-$Ni_yRu_zM_u$, which includes at least one B2 phase, where x, y, z and u are atomic percentages of the overall alloy, where the aluminum content is in the range from 20–60 atomic percent or preferably 26–60 atomic percent, i.e. where x=26–60; y>0; z>0; u>0, and where M may be one or more metals and/or semimetals selected from the group consisting of: Ir, Pt, Rh, Pd, Cr, Fe, Co, Re, Ta, Ti, Zr, Hf, Y, Sc, Si, and B. A B2 phase is an ordered cubic phase AB in which the A atoms are arranged at the corners and the B atoms are arranged in the center of the unit cell (cP2-CsCl type structure).

The core of the invention therefore consists in the unexpected fact that the addition of the component M to an alloy of type Al—Ni—Ru makes it possible to produce properties which are highly advantageous for coatings, in particular on substrates made from superalloys. The Al—Ni—Ru-M alloys contain at least one B2 structure-based phase. If phases of this type are used as coatings, they allow both a substantial gain in performance and service life and a reduction in the maintenance costs for gas turbines and jet engine components. The Al—Ni—Ru-M alloys have a number of properties, namely:

(1) Greatly increased stability with respect to oxidation compared to commercially available MCrAlY bond coats (BC) in which M is normally Co, Ni or Co/Ni.

(2) Amazingly low thermal conductivity compared to other intermetallic compounds, including conventional B2 phases.

(3) Satisfactory plastic deformability and other mechanical properties which are characteristic of ruthenium aluminides.

(4) High melting points, which ensure correspondingly low diffusion rates within the alloys.

(5) Thermal expansion coefficients which are close to those of the substrates made from superalloys.

These Al—Ni—Ru-M alloys can therefore be used as coatings which protect against environmental influences and as thermal barriers for blades and vanes of gas turbines and jet engines used in high-temperature and corrosive environments.

It should be noted that this alloy may also contain other components in small amounts, e.g. as impurities, provided that the properties as a thermal and corrosion-inhibiting barrier layer are retained.

By way of example, it is also possible to use combinations such as Al—Ni—Ru—Ir, Al—Ni—Ru—Si, but also alloys such as Al—Ni—Ru—Cr—Ir, etc., i.e. with more than one component of type M, with the corresponding advantageous properties.

Combinations with either a single component M or with two different components of this type are particularly advantageous.

According to a first preferred embodiment of the alloy according to the invention, x=26–60, preferably x=40–55. As an alternative or in addition, y may be 10–50, preferably y=10–40. It is also possible for z to be selected in the range from 5–40, preferably z=10–35, and/or for y+z to be in the range from 30–70, preferably in the range from y+z=35–55. The variable u is preferably set within the following range: 0<u<=40, preferably u=5–30.

According to a further preferred embodiment, the alloy is distinguished by the fact that it includes at least two different, thermodynamically stable phases of type B2. It has been found that if two such phases with different compositions are present, particularly advantageous properties of the coatings are obtained.

Furthermore, the present invention relates to a process for producing a compound as described above in which the components are melted together under shielding gas. This melting operation can be carried out in an arc.

It has proven particularly advantageous for the compound to be annealed after it has been melted together under shielding gas, particularly preferably in a furnace. This takes place, for example, at a temperature in the range from 900 to 1100 degrees Celsius for a time of more than one week, preferably in the region of 4 weeks. After the annealing, the material is advantageously cooled in the furnace. The annealing may in this case be carried out in a structured manner, for example stepwise, in which case it is possible to use a scheme with a temperature which increases in steps or decreases in steps or a combination of such schemes.

A preferred embodiment of the process according to the invention is characterized in that the compound is applied to a material as a coating, in particular to a substrate made from a superalloy, for which purpose it is possible to use in particular processes such as plasma spraying (e.g. air plasma spraying, APS; vacuum plasma spraying, VPS; low-pressure plasma spraying, LPPS) or high-velocity methods (e.g. high-velocity oxyfuel spraying, HVOF), if appropriate followed by annealing and/or by aluminizing.

Moreover, the present invention relates to the use of a compound or alloy as described above, preferably produced according to one of the processes as described above. The material is in this case to be used as material for a component which is exposed to high temperatures and which in particular is exposed to hot, possibly corrosive gases and/or has hot gases flowing around it. This may be a component of a gas turbine or a compressor or a jet engine, particularly preferably a blade or guide vane of a gas turbine or a compressor or a jet engine.

In this context, it is preferable for the compound to be in the form of a coating, particularly preferably for the surface which is directly exposed to the hot gases, with a further functional layer, in particular for promoting bonding or for providing a further barrier action, optionally being present beneath the coating. Alternatively, however, it is also possible for a further layer, for example of yttrium-stabilized zirconium, to be provided on a layer of material according to the invention. A coating of this type may have a thickness in the range from 10–400 µm, particularly preferably in the range from 100 to 200 µm.

Furthermore, the present invention relates to a coating with an alloy as described above and/or a part or component of a gas turbine or steam turbine or of a jet engine having a coating of this type. In this case, the alloy of type Al—Ni—Ru-M is typically applied to a substrate made from superalloy, which has optionally been covered with a bond coat preferably of type MCrAlY (BC, in which M is normally Co, Ni or Co/Ni). The layer of the alloy according to the invention in this case, by way of example, has a thickness in the range from 100–500 µm. It is optionally possible for a further ceramic layer, in particular of yttrium-stabilized zirconium (YSZ), to be arranged on this layer of the alloy.

BRIEF DESCRIPTION OF THE DRAWINGS

The invention is to be explained in more detail below on the basis of exemplary embodiments in conjunction with the drawings, in which.

DETAILED DESCRIPTION OF THE PREFERRED EMBODIMENTS

Thermal degradation and oxidation of components of gas turbines or jet engines under the simultaneous action of high temperature and oxidation or a corrosive environment restrict the possible operating temperature (which reduces the possible efficiency of the turbine) and lead to a reduction of the service life of the components (with an associated increase in maintenance costs). A modem system protecting against thermal loading and oxidation may generally be considered as a three-layer structure: a superalloy substrate SX based on nickel (Ni), a bond coat (BC, MCrAlY or nickel aluminides) and an outer layer of a thermally insulating oxide (thermal barrier coating, TBC, normally YSZ).

Unfortunately, composite structures assembled in this way lead to spallation of the YSZ layer in hot and aggressive environments. This occurs on account of a poor match between the coefficients of thermal expansion of the metallic and ceramic parts of the component, on account of the formation of a mixture of different oxides, with the inclusion of spinels, which form at the interface between YSZ/BC, on account of harmful interdiffusion, etc. On the other hand, YSZ, in addition to its unique thermal insulation properties, also has a number of drawbacks, specifically for example inadequate mechanical integrity, high relative density, oxygen permeability, etc.

During systematic analysis of Al—Ni—R-M alloys with a B2-type-based structure, it can be observed that these alloys have very high melting points and are highly stable with respect to oxidation yet have an unexpectedly low thermal conductivity. Accordingly, these B2 Al—Ni—Ru-M alloys may perform various functions, such as (i) protection against oxidation, (ii) as a bond coat, and (iii) thermal insulation.

Figure 1:
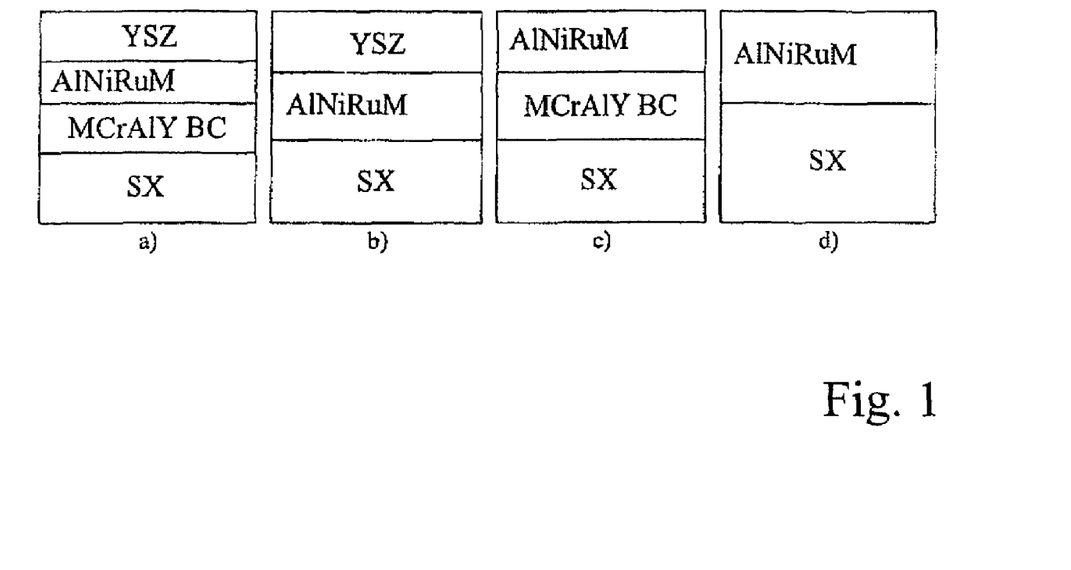
FIG. 1 shows diagrammatic illustrations of possible thermal barrier coatings made from Al—Ni—Ru-M alloys, in which the upper side is exposed to the gases.

The alloys can be used as BC together with or instead of existing types of bond coats. Possible layer structures are summarized in FIG. 1. FIG. 1a) shows a structure in which the proposed layer is located between the YSZ layer arranged at the surface and the BC layer arranged directly on the superalloy SX. In a structure of this type, the layer of MCrAlY BC typically has a thickness of from 100 to 300 µm, the layer of AlNiRuM typically has a thickness of from 100 to 300 µm, and the layer of YSZ typically has a thickness of from 100 to 300 µm. The thickness is in this case dependent on the manner of application, for example in the case of APS a layer of YSZ with a thickness in the range from 100–400 µm is produced, whereas in the case of EBPVD (electron beam physical vapor deposition) a thickness of 100–150 µm is produced. In FIG. 1b), the BC layer is omitted and the proposed layer is located between the surface layer of YSZ and the layer of superalloy SX. Composite structures of this type ensure improved adhesion of the YSZ layer to the metallic parts of the component and, moreover, ensure a significantly improved resistance to oxidation and/or corrosion. The layer of AlNiRuM in this case typically has a thickness of from 100 to 300 μm, and that of YSZ typically has a thickness of from 100 to 300 μm.

Alternatively, the Al—Ni—Ru-M alloys of a certain composition may be used instead of the BC and YSZ layers and may at the same time perform the abovementioned functions of the bond coat and the TBC function of YSZ. This covering coating comprising just one layer will have a significantly greater resistance to mechanical cracking than the existing multilayer compositions. FIG. 1c) shows an arrangement in which the proposed layer is at the surface and is located above a BC layer on the layer of superalloy SX. In a structure of this type, the layer AlNiRuM typically has a thickness of from 300 to 800 μm, while that of MCrAlY BC has a thickness of from 100 to 300 μm. Lastly, FIG. 1d) illustrates a structure in which just a single layer of the proposed material is arranged on the layer of superalloy SX. The single layer of AlNiRuM in a structure of this type typically has a thickness of from 300 to 1000 μm.

Experimental Data

Figure 2:
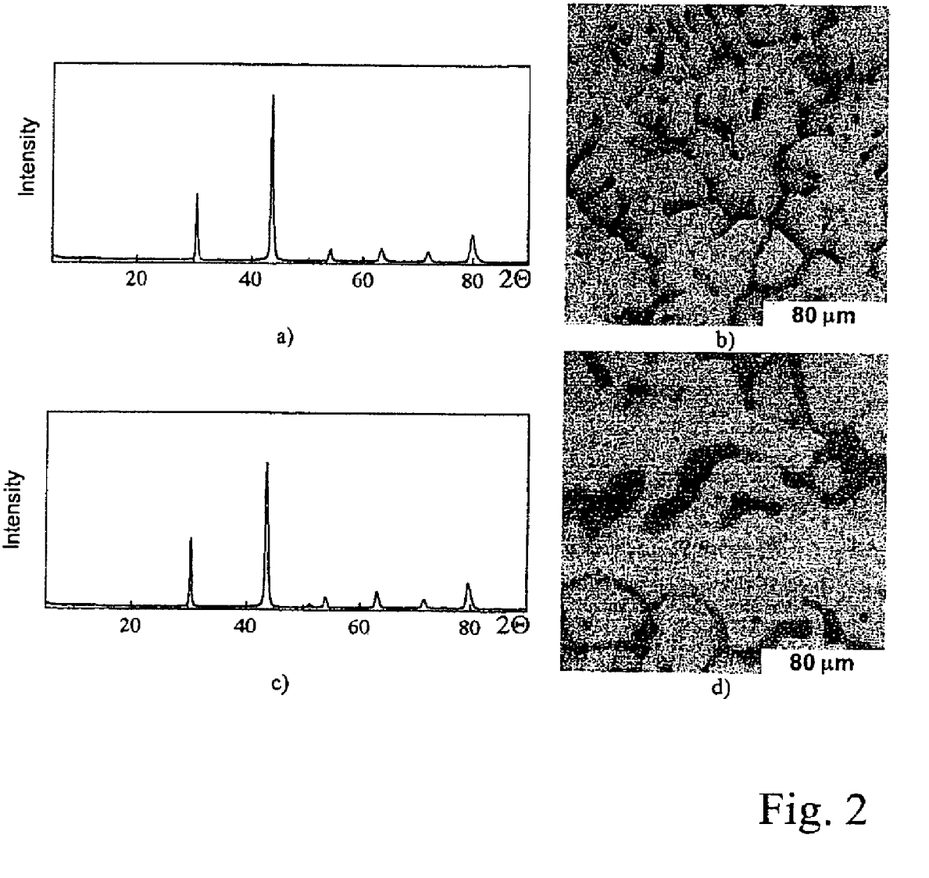
FIG. 2 shows an example of the characterization of alloy 4 and alloy 5, a) X-ray diffractogram ($\lambda$=Cu) for alloy 4 annealed at 900° C., b) SEM image for alloy 4, c) X-ray diffractogram ($\lambda$=Cu) for alloy 5 annealed at 900° C., d) SEM image for alloy 5.

The Al—Ni—Ru-M alloys were melted in an arc melting process using a permanent electrode made from tungsten under argon atmosphere with a titanium-oxygen getter in a water-cooled copper furnace. Then, the cast alloys were annealed under an argon atmosphere at 900° C. or 1100° C. for 4 weeks. The original composition, the annealing states and the results of the study are compiled in Table 1 and in FIG. 2 and 3.

representing the $\beta1$-$Al_{46}Ni_{17}Ru_{37}$ and the dark phase representing the $\gamma'$-$Al_{28}Ni_{64}Ru_8$.

Figure 3:
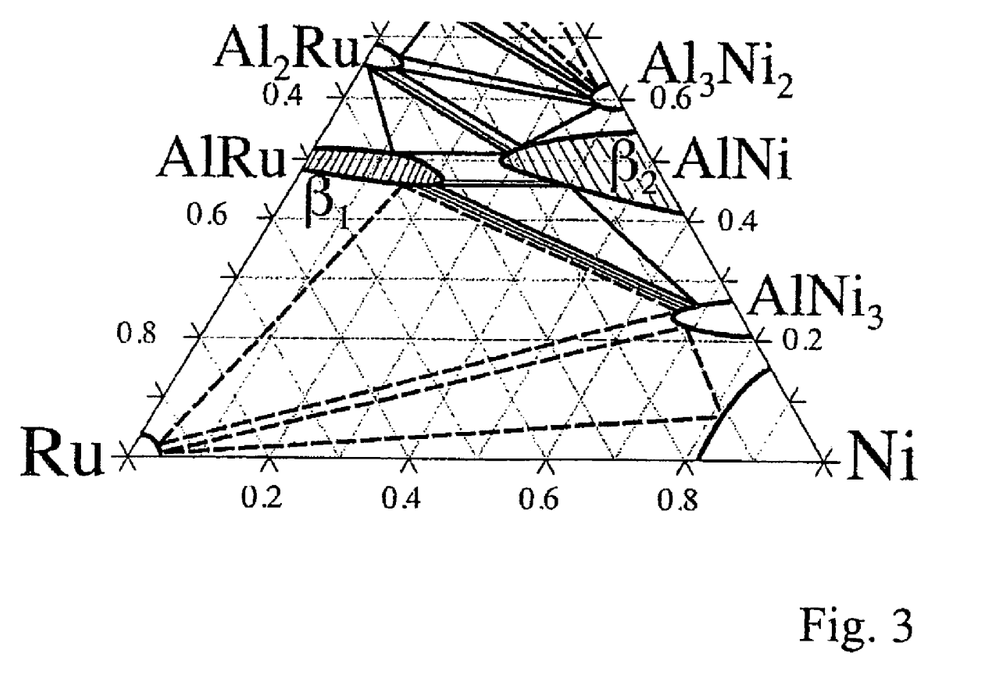
FIG. 3 shows an isothermal section through the phase diagram of AlNiRu at 900° C., in which solid lines denote known equilibrium states including known tie lines, dashed lines indicate predicted equilibria, and the regions comprising $\beta$ phases are hatched.

FIG. 3 shows an isothermal section through the phase diagram of AlNiRu at 900° C. In this figure, solid lines indicate known equilibrium states, including known tie lines. Dashed lines indicate predicted equilibria. The regions comprising βphases are hatched.

To investigate the physical properties, specimens were partially remelted, with a view to closing up pores which are present at the surface. Moreover, they were subjected to a high isostatic pressure procedure (HIP), cf. in this respect Table 2.

TABLE 2

Parameters used for the HIP

| Specimens | State | Temperature (° C.) | Pressure (bar) | Vessel | Filler | Duration of the HIP (h) |
|---|---|---|---|---|---|---|
| 9–14 | Bulk | 1360 | 1300 | Stainless steel | BN | 3 |

All these alloys were analyzed using X-ray powder diffraction methods (XRD). A scintag X-ray powder diffractometer with a germanium detector using copper radiation was used. Scanning electron microscope images (SEM) were carried out in back-scatter mode at 10 kV acceleration voltage in a Hitachi S-900 "in-lens" field emission scanning electron microscope with a standard Everhard-Thornley SE

TABLE 1

Characterization of Al-Ni-Ru-M alloys, annealed at 900 or 1100° C. for 4 weeks

| No. | Overall composition | Annealing T, ° C. | Phase 1 Composition | Structure | Phase 2 Composition | Structure | Solidus/liquidus T, ° C. |
|---|---|---|---|---|---|---|---|
| 1 | $Al_{46}Ni_{28}Ru_{26}$ | 900 | $Al_{46}Ni_{18}Ru_{36}$ | β1(B2) | $Al_{465}Ni_{35}Ru_{185}$ | β2(B2) | — |
| 2 | $Al_{43}Ni_{29}Ru_{28}$ | 900 | $Al_{46}Ni_{17}Ru_{37}$ | β1(B2) | $Al_{28}Ni_{64}Ru_8$ | γ | — |
| 3 | $Al_{515}Ni_{265}Ru_{22}$ | 900 | $Al_{64}Ni_2Ru_{34}$ | $Al_2Ru$ | $Al_{505}Ni_{29}Ru_{205}$ | β2(B2) | — |
| 4* | $Al_{65}Ni_{20}Ru_{15}$ | 900 | $Al_{65}Ni_4Ru_{31}$ | $Al_2Ru$ | $Al_{60}Ni_{36}Ru_4$ | $Al_3Ni_2$ | — |
| 5 | $Al_{50}Ni_{37}Ru_{10}Si_3$ | 900 | — | — | $Al_{50}Ni_{37}Ru_{10}Si_3$ | β2(B2) | >1500 |
| 6 | $Al_{47}Ni_{37}Ru_{10}Fe_6$ | 1100 | — | — | $Al_{47}Ni_{37}Ru_{10}Fe_6$ | β2(B2) | >1500 |
| 7 | $Al_{46}Ni_{34}Ru_{10}Fe_{10}$ | 1100 | $Al_{46}Ni_{28}Ru_{17}Fe_9$ | β1(B2) | $Al_{46}Ni_{36}Ru_7Fe_{11}$ | β2(B2) | 1590/1800 |
| 8** | $Al_{46}Ni_{28}Ru_9Fe_{17}$ | 1100 | $Al_{50}Ni_{24}Ru_{10}Fe_{16}$ | β1(B2) | $Al_{22}Ni_{47}Ru_3Fe_{28}$ | γ | — |
| 9 | $Al_{45}Ni_{12}Ru_{43}$ | 900 | $Al_{45}Ni_{12}Ru_{43}$ | β1(B2) | — | — | >2100 |
| 10 | $Al_{46}Ni_{29}Ru_{25}$ | 900 | $Al_{46}Ni_{18}Ru_{36}$ | β1(B2) | $Al_{465}Ni_{35}Ru_{185}$ | β2(B2) | 1870/2090 |
| 11 | $Al_{44}Ni_{45}Ru_{11}$ | 900 | — | — | $Al_{44}Ni_{45}Ru_{11}$ | β2(B2) | 1745/1875 |
| 12 | $Al_{42}Ni_{48}Ru_{10}$ | 900 | $Al_{28}Ni_{69}Ru_4$ | γ | $Al_{43}Ni_{46}Ru_{11}$ | β2(B2) | 1645/1910 |
| 13 | $Al_{45}Ni_{235}Ru_{29}Cr_{25}$ | 900 | $Al_{45}Ni_{185}Ru_{345}Cr_2$ | β1(B2) | $Al_{45}Ni_{305}Ru_{21}Cr_{35}$ | | 1830/2080 |
| 14 | $Al_{44}Ni_{29}Ru_{24}Ir_3$ | 900 | $Al_{44}Ni_{19}Ru_{335}Ir_{35}$ | β1(B2) | $Al_{44}Ni_{40}Ru_{145}Ir_{15}$ | β2(B2) | 1880/2100 |

*Alloy also contains small quantities of a phase based on $Al_{13}Ru_4$
**Alloy also contains small quantities of a phase based on $Al_2Ru$.

FIG. 2 shows examples of the characterization of alloys of type Al—Ni—Ru. In this figure, a) shows a powder X-ray diffraction pattern (XRD) using λ-Cu radiation for alloy of type 4 from Table 1, annealed at 900° C. FIG. 2b) shows images from a scanning electron microscope (SEM, in back-scatter) for alloy 4, with the light phase representing the $\beta1$-$Al_{46}Ni_{18}Ru_{36}$ and the dark phase representing the $\beta2$-$Al_{46.5}Ni_{45}Ru_{8.5}$. FIG. 2c) once again shows powder X-ray diffraction patterns (XRD) using λ-Cu radiation for the alloy of type 5 from Table 1, annealed at 900° C. FIG. 2e) shows images taken by a scanning electron microscope (SEM, in back-scatter) for alloy 5, with the light phase detector and a YAG-type BSE detector. Energy-dispersive X-ray spectroscopy (EDS) was carried out at an acceleration voltage of 15 to 30 kV, using a "LEO 1530" analyzer using the VOYAGER software package. Electron microprobe analysis (EPMA) was carried out using a "CAMECA SX50" microanalyzer. The result was that it was possible to unambiguously confirm the existence of a miscibility gap between AlRu and AlNi phases in the ternary AlNiRu system.

The phase transition temperatures were determined using differential thermal analysis (DTA) on a "Perkin Elmer DTA 7" appliance up to a temperature of 1500° C. using aluminum trioxide crucibles under high-purity argon with heating and cooling rates of 10° C. per minute. A differential thermal appliance "HT-DTA-3" was used to measure melting points above 1500° C., as described in Kocherzhinskiy Y. A., Shishkin E. A., Vasilenko V. I., (1971), Phase diagrams of the metallic systems, ed. Ageev N. V. and Ivanov O. S., Moskau: Nauka, 245. It was operated up to 2200° C. using hafnium dioxide and scandium trioxide crucibles using W/W-20Re thermoelectric elements under high-purity helium with heating and cooling rates of 50° C. per minute. The melting points of Al—Ni—Ru-M alloys are compiled in Table 1. All the specimens analyzed had high melting points, making these alloys predestined for use as high-temperature coatings. The highest melting point observed among the alloys studied even exceeds 2100° C.

Figure 4:
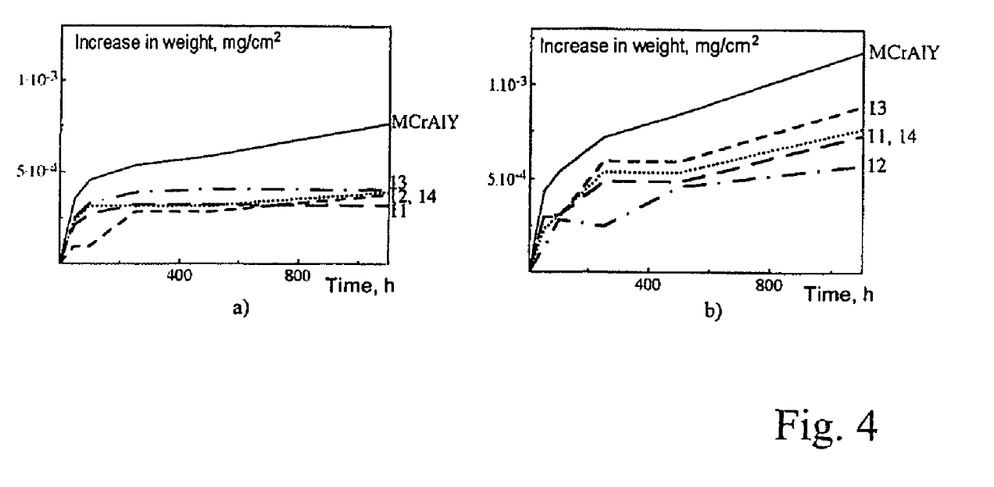
FIG. 4 shows the increase in weight of Al—Ni—Ru-M B2 alloys compared to commercially available MCrAlY as a function of the oxidation time under laboratory atmosphere at a) 950° C. and b) 1050° C.
Figure 5:
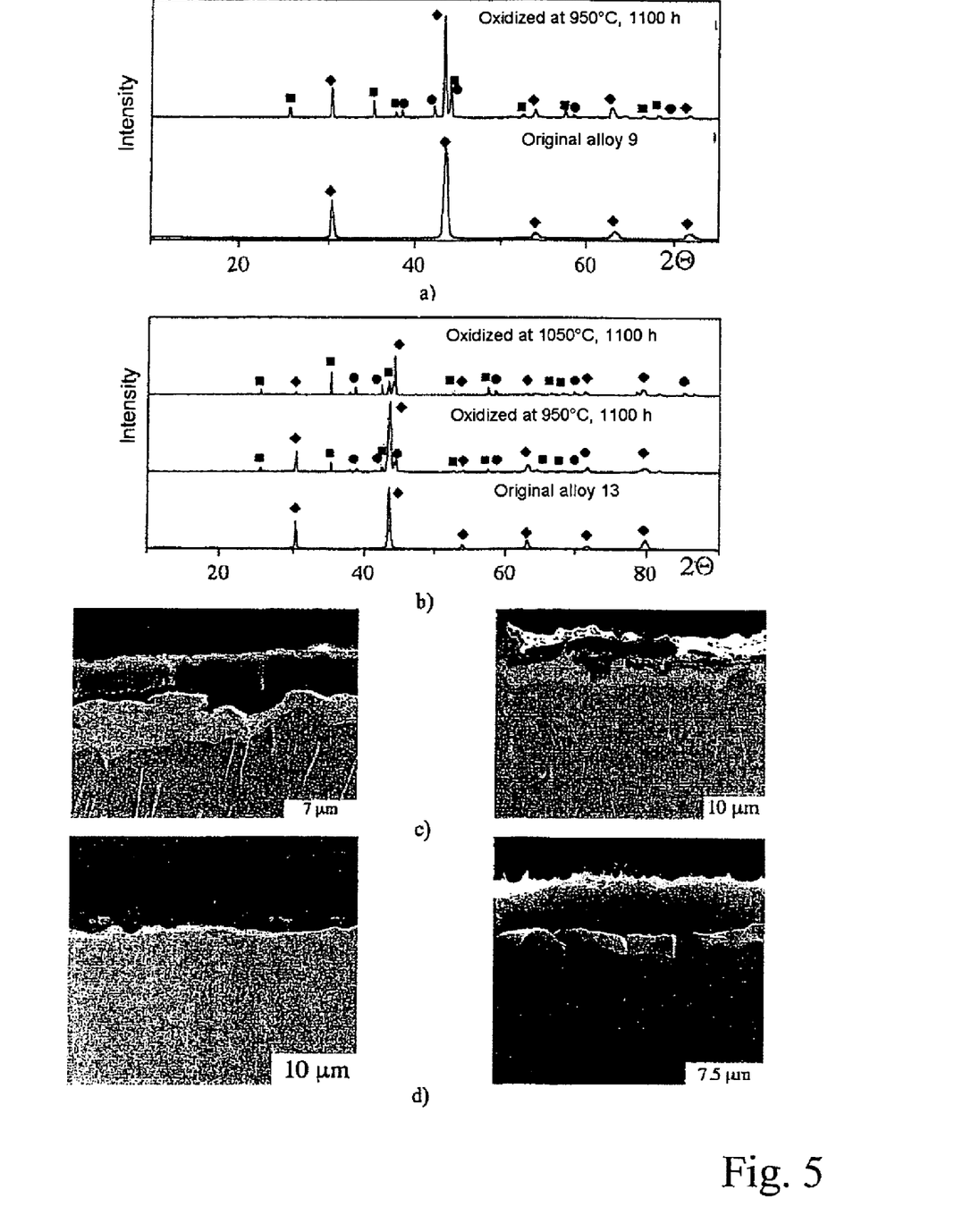
FIG. 5 shows the oxidation characteristics of the ruthenium-rich alloys 9 and 13, a) X-ray diffractogram for 9; b) X-ray diffractogram for 13, in which a square standing on end in each case indicates the $\beta$ phase, a circle represents the $\alpha$-$Al_2O_3$ phase and a square on its side represents Ru, c) SEM image for 9, d) SEM image for 13, with the oxidation at 950° C. in each case indicated on the left-hand side and the oxidation at 1050° C. in each case indicated on the right-hand side.
Figure 6:
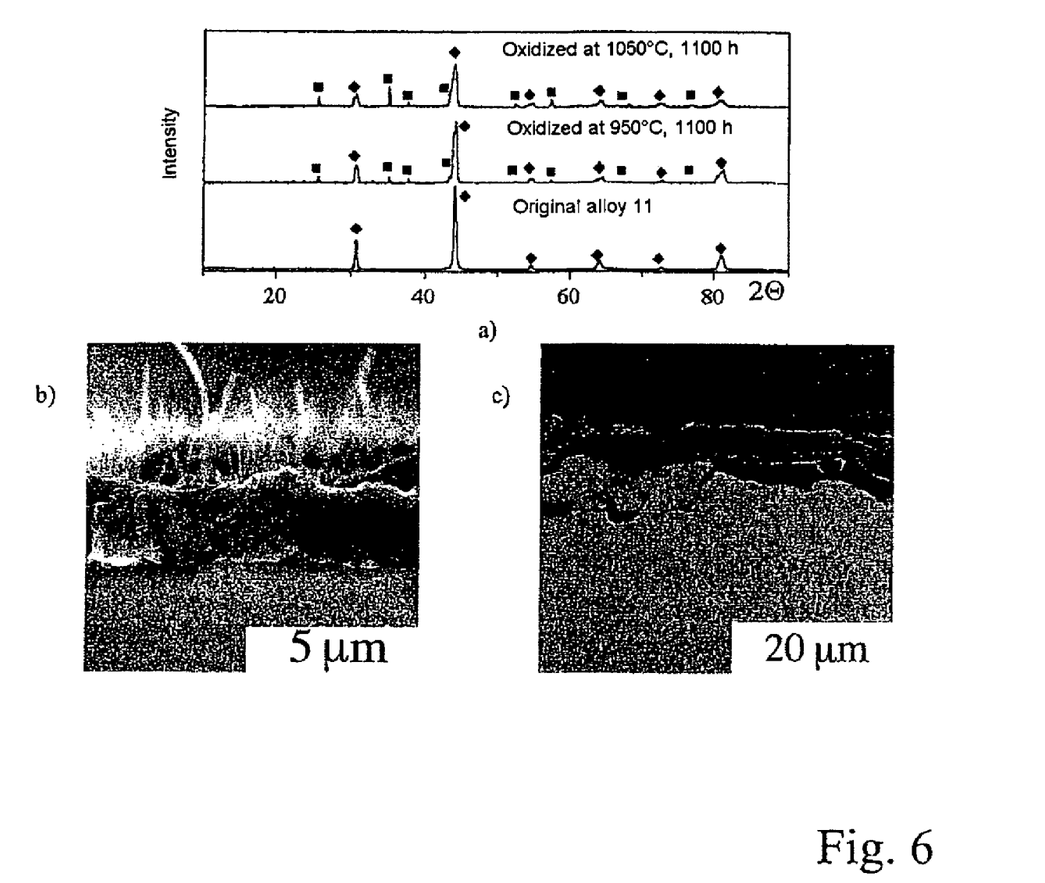
FIG. 6 shows the oxidation characteristics of a nickel-rich alloy 11, a) X-ray diffractogram, in which a square standing on end in each case represents the $\beta$ phase, a circle represents the $\alpha$-$Al_2O_3$ phase and a square resting on its side represents Ru, b) SEM image of a specimen oxidized at 950° C., c) SEM image of a specimen oxidized at 1050° C.
Figure 7:
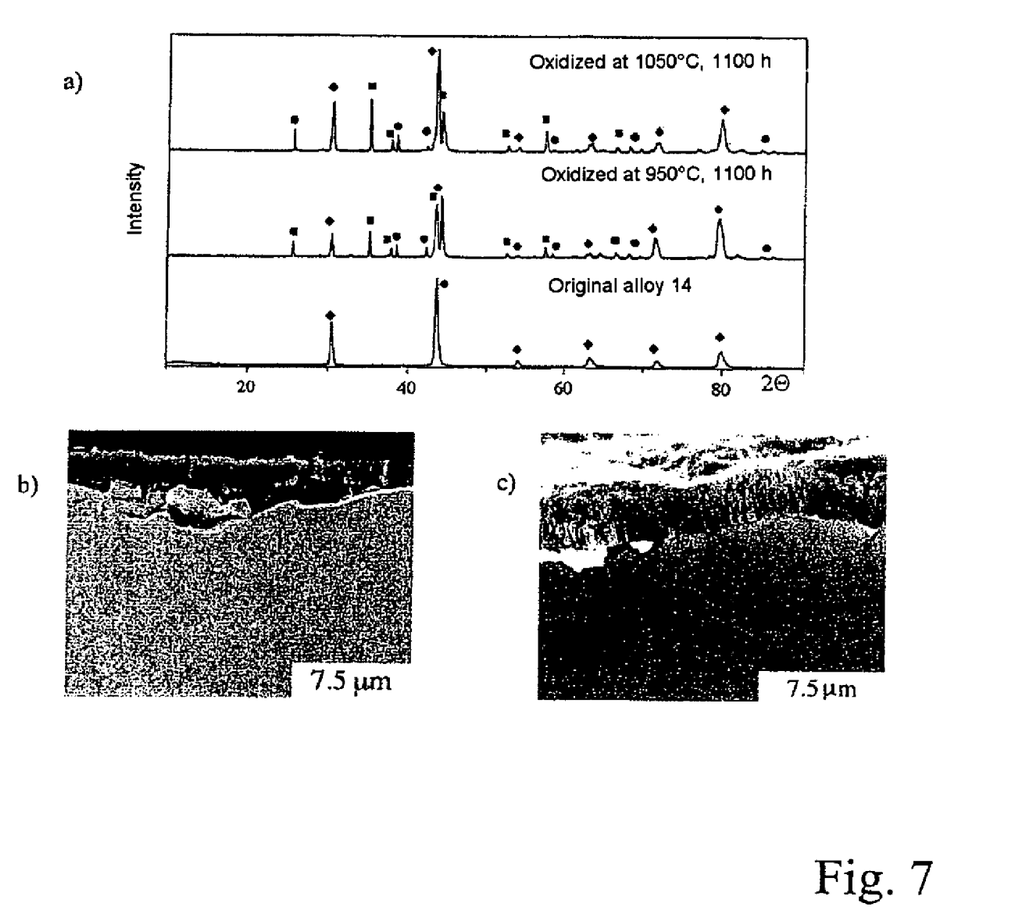
FIG. 7 shows the oxidation characteristics of alloy 14, a) X-ray diffractogram, in which a square standing on end in each case represents the $\beta$ phase, a circle represents the $\alpha$-$Al_2O_3$ phase and a square resting on its side represents Ru, b) SEM image of a specimen oxidized at 950° C., c) SEM image of a specimen oxidized at 1050° C.

Oxidation tests were carried out under standard atmosphere at 950° C. and 1050° C. using MCrAlY as internal standard. The oxidation of Al—Ni—Ru-M B2 alloys is slower than that of commercially available MCrAlY, cf. in this respect FIG. 4. The protective $\alpha$-$Al_2O_3$ surface layer is developed after just 100 to 150 hours under oxidation at 950° C. and 1050° C. This protective layer is (i) single-phase, (ii) dense, (iii) does not contain any significant level of nickel or ruthenium and (iiii) has good bonding to the coating. A dense, continuous ruthenium underlayer is formed between the $\alpha$-$Al_2O_3$ layer and the alloy for a composition with a ruthenium content of >25 atomic %. The layer may (i) contain significant quantities of chromium or iridium and (ii) has good bonding to the surface layer and to the coating. There are no significant differences in the oxidation mechanism of Al—Ni—Ru-M B2 alloys at 950° C. and 1050° C., cf. in this respect FIGS. 5 to 7. The oxidation resistance of the studied B2-based structures formed from nickel-ruthenium aluminides is significantly better than that measured for the reference alloy MCrAlY.

Figure 8:
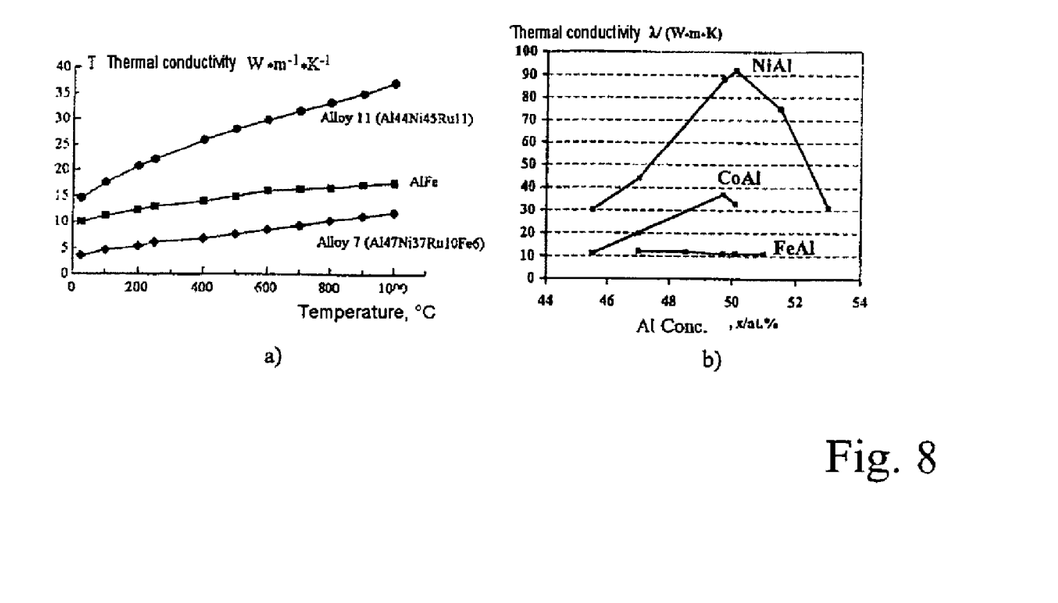
FIG. 8 shows thermal conductivities for B2 alloys, a) temperature dependency of the thermal conductivity of Al—Ni—Ru-M alloys compared to AlFe, in which the data for AlFe originate from Reddy B. V., Deevi S. C., (2000), Intermetallics, 8,1369, b) dependency of the thermal conductivity of various B2 alloys on the Al concentration at room temperature (data from Terada Y., Ohkubo K., Nakagawa K., Mohri T., Suzuki T., (1995), Intermetallics, 3,347)
Figure 9:
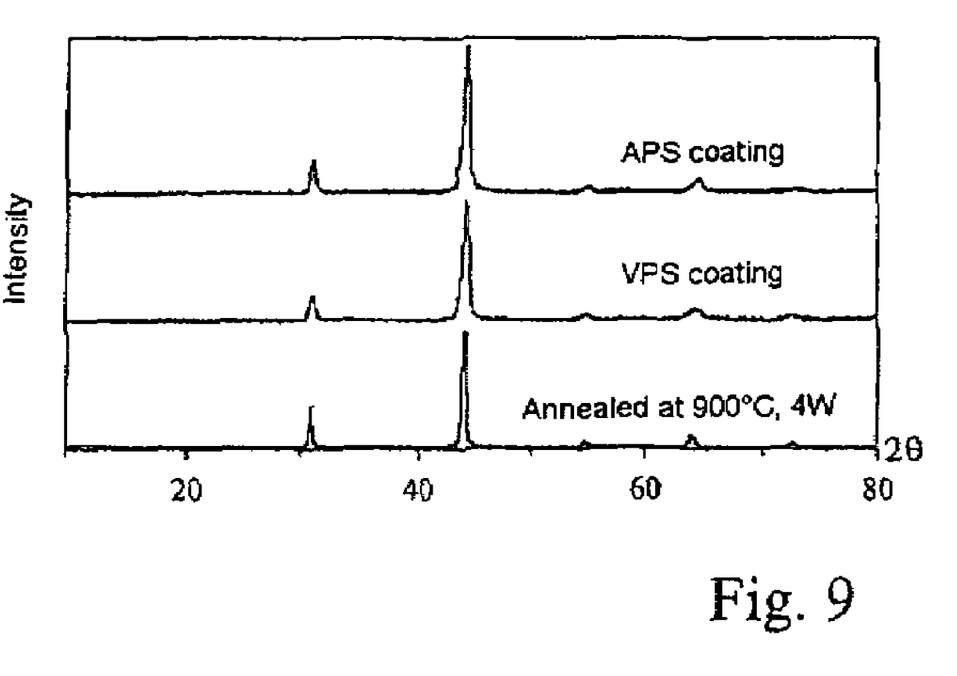
FIG. 9 shows X-ray diffractograms for B2 structure-based $Al_{50}Ni_{40}Ru_{10}$ coatings which have been obtained using vacuum plasma spraying (VPS) and plasma methods (air plasma spraying APS) compared to the original annealed alloy.

Laser flash methods were used to measure the thermal conductivity. It was measured in an appliance of type "TC-3000H/L SINKU-RIKO" as described in the following references: Parker W. J., Jenkins R., Burner C. P., Abort G. L., (1961), J. Appl. Phys., 32(9), 1679; Namba S., Kim P. H. and Arai T., (1967), J. Appl. Phys., 36(8), 661. Al—Ni—Ru-M B2 alloys of a certain composition had a surprisingly low thermal conductivity compared to other intermetallic compounds, including conventional B2 phases. The ternary Al—Ni—RuB2 alloys already have a lower thermal conductivity than Al—Ni and Al—Co B2 structure-based phases. If ruthenium is substituted for iron, the thermal conductivity is reduced by approximately a factor of 3 at room temperature, cf. in this respect FIG. 8.

The measurements of the coefficients of thermal expansion (CTE) were carried out using an appliance of type DIL 402C (push-rod) dilatometer, produced by NETZSCH. The specimens were cut into rods with a diameter of 5 mm and a length of approximately 5 mm. The appliance was operated in a temperature range from 20° C. to 1000° C. The temperature was changed at a rate of 5° C. per minute. The reproducibility was verified by measuring each specimen 3 times. The measurements were carried out under an argon atmosphere, which was sufficient to prevent oxidation.

The good correspondence between the coefficients of thermal expansion of B2 structure-based Al—Ni—Ru-M alloys and those of the substrates made from advanced CMSX-4 alloy can be seen from Table 3.

TABLE 3

Technical coefficients of thermal expansion
$\alpha = [(1/l_0)/\Delta T][\times 10^{-6}, K^{-1}]$
for the B2 structure-based alloys 8 ($Al_{46}Ni_{28}Ru_9Fe_{17}$) and advanced CMSX-4 alloy.

| | $\alpha[\times 10^{-6}, K^{-1}]$ | |
|---|---|---|
| T, ° C. | Alloy 8 | Advanced CMSX-4 |
| 20 | — | — |
| 100 | 12.75 | 11.59 |
| 200 | 13.80 | 11.99 |
| 300 | 14.17 | 12.33 |
| 400 | 14.49 | 12.68 |
| 500 | 15.02 | 13.03 |
| 550 | 15.32 | 13.22 |
| 600 | 15.55 | 13.41 |
| 650 | 15.73 | 13.61 |
| 700 | 15.85 | 13.82 |
| 750 | 15.92 | 14.05 |
| 800 | 15.96 | 14.30 |
| 850 | 16.03 | 14.57 |
| 900 | 16.11 | 14.87 |
| 950 | 16.16 | 15.23 |
| 1000 | 16.19 | 15.66 |

The original alloys for the coating were produced in a vacuum induction melting furnace under 140 mbar partial pressure of high purity 8.4 argon at 75 kW 2000 Hz and in a magnesium oxide crucible at a temperature of approximately 1800° C.

A powder was formed using the "counter-stream milling method" using an appliance of type 100 AFG (HOSOKAWA ALPINE AG & Co. OHG, Germany) under a nitrogen atmosphere. The measured parameters were $d_{50}$=30 μm, $d_{100}$=63 μm. The Malvern method was used to measure the particle size distribution.

The coatings were applied to the substrates made from superalloy SX, which consisted of advanced CMSX-40® (Cannon Muskegon Corporation, Michigan, US), using methods such as vacuum plasma spraying (VPS), plasma methods (air plasma spraying, APS) and high-velocity oxy-fuel (HVOF). The thickness of the coating of Al—Ni—Ru-M varied from 100 to 300 μm.

The compatibility between the coatings and the superalloy substrates SX was investigated using the diffusion coupling approach. The diffusion pairs were brought together by annealing cylindrical specimens in molybdenum vessels at 1100° C. under a vacuum of $10^{-6}$ bar for 15 hours, followed by annealing at the same temperature and in vacuo for 50 hours without any additional mechanical pressure loading.

The analysis of coatings using XRD, SEM, EDS, EPMA and WD-XRF methods (wavelength dispersive X-ray fluorescence) confirmed their B2-based structure. The WD-XRF measurements were carried out using an appliance of type Analytical PW2400 (PANalytical) produced by Philips with an Rh X-ray tube at the Eidgenössischen Materialprüfungs- and Forschungsanstalt EPMA Dübendorf. The UniQuant4 software package was used for data processing.

The sufficient hardness and low porosity of the coatings can be seen from Table 4.

TABLE 4

Hardness (Vickers hardness Hv) and porosity of B2 structure-based alloys of type $Al_{50}Ni_{40}Ru_{10}$

| Coating method | Hv, 300 g, 30 s | Porosity (%) |
|---|---|---|
| APS | 425.78 | 8.5 |
| VPS | 629.63 | 5.3 |

The instrumentation used to measure the microhardness was as follows: A Zeiss Axioplan Microscope to generate an optical image, a Panasonic WV CD 50 instrument, CCD camera for recording the image, SONY monitor for representing the digitized image and ANTON PAAR MHT-4 computer for calculating the microhardness values from the applied load and the measured diagonals.

The porosity of the coatings was determined using the AnalySis software package (Soft Imaging System GmbH, Germany) with the aid of the scanning electron microscope images.

By way of non-limiting examples, an alloy or coating embodying principles of the present invention can have one or more of the following characteristics: M=Y and $0<u \leq 0.5$; the alloy has a thermal conductivity at room temperature of less than 6 $Wm^{-1}K^1$; the alloy has a thermal conductivity at 10000° C. of less than 15 $Wm^{-1}K^{-1}$; the alloy has a coefficient of thermal expansion (CTE) of $(10-20)\ 10^{-6}K^{-1}$ in a temperature range from room temperature to 10000° C.; M=Ir, Pt, Rh, or Pd, and u=2–5; M=Cr and u=2–10; M=Fe and u=7–12; M=Zr or Hf, and $0 \leq u \leq 1$; M=Y or Sc, and $0 \leq u \leq 1$; M=Si, B, Nb, Mo, or W, and $0 \leq u \leq 2$; M=Re or Ti, and $0 \leq u \leq 5$; M=Ta and $0 \leq u \leq 10$; x=46, y=34, z=10, and u=10; the CTE is $(14-17)\ 10^{-6}\ K^{31\ 1}$ in a temperature range from room temperature to 10000° C.; the multinary alloy coating has a thickness up to 2000 μm; and the YSZ has a thickness in the range from 50–300 μm.

| LIST OF DESIGNATIONS | |
|---|---|
| YSZ | Yttrium-stabilized zirconium |
| BC | Bond coat |
| SX | Superalloy |
| TBC | Thermal barrier coating |
| XRD | X-ray diffraction |
| SEM | Scanning electron microscopy |
| HIP | High isostatic pressure procedure |
| EDS | Energy dispersive X-ray spectroscopy |
| EPMA | Electron microprobe analysis |
| DTA | Differential thermal analysis |
| CTE | Coefficient of thermal expansion |

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A multinary alloy of the form:
$Al_xNi_yRu_zM_u$, which includes at least 30% by mass of at least one B2 structure;
wherein x, y, z, and u are atomic percentages of the overall alloy;
wherein x=40–55, y=10–50, z=5–40, and u=5–30;
and wherein M is at least one metal or semimetal selected from the group consisting of Ir, Pt, Rh, Pd, Cr, Fe, Co, Re, Ta, Ti, Zr, Hf, Y, Sc, Si, Nb, Mo, W, and B.

2. The alloy as claimed in claim 1, wherein:
y=10–50;
z=5–40;
y+z=30–70;
u=5–30; or
combinations thereof.

3. The alloy as claimed in claim 2, wherein y=10–40.

4. The alloy as claimed in claim 2, wherein z=10–35.

5. The alloy as claimed in claim 2, wherein y+z=35–55.

6. The alloy as claimed in claim 1, wherein:
when M=Co, u=5–30;
when M=Ir, Pt, Rh, or Pd, u=5–10;
when M=Cr, u=5–15;
when M=Fe, u=5–30;
when M=Zr or Hf, u=5;
when M=Si, B, Nb, Mo, or W, u=5;
when M=Re or Ti, u=5–10;
when M=Ta, u=5–20; and
wherein $u \geq 5$ for at least one M.

7. The alloy as claimed in claim 6, wherein M=Co and u=5–20.

8. The alloy as claimed in claim 6, wherein M=Ir, Pt, Rh, or Pd, and u=5.

9. The alloy as claimed in claim 6, wherein M=Cr and u=5–10.

10. The alloy as claimed in claim 6, wherein M=Fe and u=7–12.

11. The alloy as claimed in claim 6, wherein M=Re or Ti, and u=5.

12. The alloy as claimed in claim 6, wherein M=Ta and $5 \leq u \leq 10$.

13. The alloy as claimed in claim 1, wherein M is selected from the group consisting of Cr, Ir, Si, and Pt, x=43–53, and u=5–20; and wherein
y=30–45 when z=5–17,
y=18–35 when z=17–35, or
y=5–18 when z=30–40.

14. The alloy as claimed in claim 1, wherein M=Fe, x=45–50, y=30–35, z=9–12, and u=8–12.

15. The alloy as claimed in claim 14, wherein x=46, y=34, z=10, and u=10.

16. The alloy as claimed in claim 1, wherein said alloy has a stability with respect to oxidation which is higher than that of a coating of MCrAlY with M=Ni, M=Co, M=Fe, or combinations thereof, at temperatures above room temperature.

17. The alloy as claimed in claim 1, wherein said alloy has a thermal conductivity at room temperature of less than 6 $Wm^{-1}K^{-1}$.

18. The alloy as claimed in claim 1, wherein said alloy has a thermal conductivity at 10000° C. of less than 15 $Wm^{-1}K^{-1}$.

19. The alloy as claimed in claim 1, wherein said alloy has a coefficient of thermal expansion (CTE) of $(10-20)\ 10^{-6}\ K^{-1}$ in a temperature range from room temperature to 10000° C.

20. The alloy as claimed in claim 19, wherein the CTE is $(14-17)\ 10^{-6}\ K^{-1}$ in a temperature range from room temperature to 10000° C.

21. A process for producing an alloy as claimed in claim 1, comprising:
melting the components together; and
annealing the melted components to the equilibrium state.

22. The process as claimed in claim 21, further comprising:
applying the alloy to a material as a coating.

23. The process as claimed in claim 22, wherein applying comprises thermospraying (APS, VPS, LPPS), high-velocity methods (HVOF) followed by annealing, or electroplating combined with aluminizing.

24. The process as claimed in claim 21, wherein melting comprises melting under shielding gas.

25. The process as claimed in claim 24, wherein melting under a shielding gas comprises melting in an arc.

26. The process as claimed in claim 21, wherein annealing comprises annealing at at least 900 degrees Celsius.

27. The process as claimed in claim 26, wherein annealing comprises annealing in a high isostatic pressure (HIP) process.

28. The alloy as claimed in claim 1, wherein said at least one B2 structure comprises two different, thermodynamically stable B2 phases.

29. A coating formed from a multinary alloy of the form:
$Al_xNi_yRu_zM_u$ which includes at least 30% by mass of at least one B2 structure;
wherein x, y, z, and u are atomic percentages of the overall alloy;
wherein x=40–55, y=10–50, z=5–40, u=5–30; and
wherein M is at least one metal or semimetal selected from the group consisting of:
Ir, Pt, Rh, Pd, Cr, Fe, Co, Re, Ta, Ti, Zr, Hf, Y, Sc, Si, Nb, Mo, W, and B.

30. The coating as claimed in claim 29, further comprising:
a substrate made from a high-temperature structure material; and
wherein the coating is applied to the substrate.

31. The coating as claimed in claim 30, wherein the high-temperature structure material comprises a refractory, an ultrahigh-melting metal, or a superalloy.

32. The coating as claimed in claim 31, wherein the high-temperature structure material is based on nickel, cobalt, iron, or combinations thereof.

33. The coating as claimed in claim 29, comprising:
a multilayer structure including a bond coat arranged between the high-temperature structure material and the $Al_xNi_yRu_zM_u$, said Al—Ni—Ru-M alloy applied with a thickness in the range from 300–1000 μm, the bond coat applied with a thickness in the range from 30–300 μm, and an optional layer arranged on said layer of said alloy.

34. The coating as claimed in claim 33, wherein the bond coat comprises MCrAlY.

35. The coating as claimed in claim 33, wherein the optional layer comprises yttrium-stabilized zirconium (YSZ).

36. The coating as claimed in claim 35, wherein the YSZ has a thickness in the range from 50–300 km.

37. The coating as claimed in claim 29, further comprising:
a ceramic thermal barrier coating arranged on the layer of $Al_xNi_yRu_zM_u$.

38. The coating as claimed in claim 37, wherein the ceramic thermal barrier coating comprises yttrium-stabilized zirconium.

39. The coating as claimed in claim 38, wherein the yttrium-stabilized zirconium has a columnar structure.

40. The coating as claimed in claim 38, wherein the yttrium-stabilized zirconium has been applied using APS or EBPVD.

41. The coating as claimed in claim 29, further comprising:
at least one bond coat of type MCrAlY (BC) including at least Ni, Co, Fe, or combinations thereof and said at least one bond coat has been applied by APS, VPS, or HVOF.

42. The coating as claimed in claim 30, wherein said substrate comprises a component configured and arranged to be exposed to high temperatures, to be exposed to hot gases, or to be exposed to hot corrosive gases.

43. The coating as claimed in claim 42, wherein the component comprises a component of a gas turbine or a compressor.

44. The coating as claimed in claim 43, wherein the component comprises a blade or guide vane of a gas turbine or a compressor.

45. The coating as claimed in claim 29, wherein the multinary alloy coating has a thickness up to 2000 μm.

46. The coating as claimed in claim 45, wherein the multinary alloy coating has a thickness in the range from 300–1000 μm.

* * * * *